US009730461B1

(12) United States Patent
Gasbarro

(10) Patent No.: US 9,730,461 B1
(45) Date of Patent: Aug. 15, 2017

(54) MULTIPLE-LEVEL SKINNING APPARATUS

(71) Applicant: Remington Holdings, LLC, Columbus, OH (US)

(72) Inventor: Geno N. Gasbarro, Columbus, OH (US)

(73) Assignee: Remington Holdings, LLC, Columbus, OH (US)

(*) Notice: Subject to any disclaimer, the term of this patent is extended or adjusted under 35 U.S.C. 154(b) by 0 days.

(21) Appl. No.: 15/196,885

(22) Filed: Jun. 29, 2016

(51) Int. Cl.
*A22C 21/00* (2006.01)
*A22B 5/16* (2006.01)

(52) U.S. Cl.
CPC .......... *A22C 21/0092* (2013.01); *A22B 5/166* (2013.01)

(58) Field of Classification Search
CPC ...... A22C 21/0092; A22C 17/12; A22B 5/168
USPC .................................. 452/125, 130
See application file for complete search history.

(56) References Cited

U.S. PATENT DOCUMENTS

| | | | |
|---|---|---|---|
| 6,129,625 A * | 10/2000 | Cate | A22C 17/0086 452/127 |
| 6,264,542 B1 | 7/2001 | Gasbarro | |
| 6,699,116 B1 | 3/2004 | Gasbarro | |
| 7,244,174 B2 * | 7/2007 | Schill | A22C 25/17 452/130 |
| 8,187,060 B1 | 5/2012 | Gasbarro | |

* cited by examiner

*Primary Examiner* — Richard Price, Jr.
(74) *Attorney, Agent, or Firm* — Jason H. Foster; Kremblas & Foster

(57) ABSTRACT

A skinning machine for any meat product, and particularly for poultry cuts. The machine includes two or more skinning stations, each of which may remove skin between a gripper and a closely-fit pinch block. The skinning stations are vertically distinct so that the first skinning station skins a first side of the product, and the second skinning station receives the product at a position lower vertically and skins the second side of the product. The product falls through a path between the two skinning stations to permit the product to rotate about one-half of a rotation. The product lands on a conveyor beneath the first skinning station that transports the product to the second skinning station facing the opposite direction from when it was in the first skinning station. By making the vertical drop sufficient, the poultry cut rotates the unskinned face down prior to skinning.

7 Claims, 3 Drawing Sheets

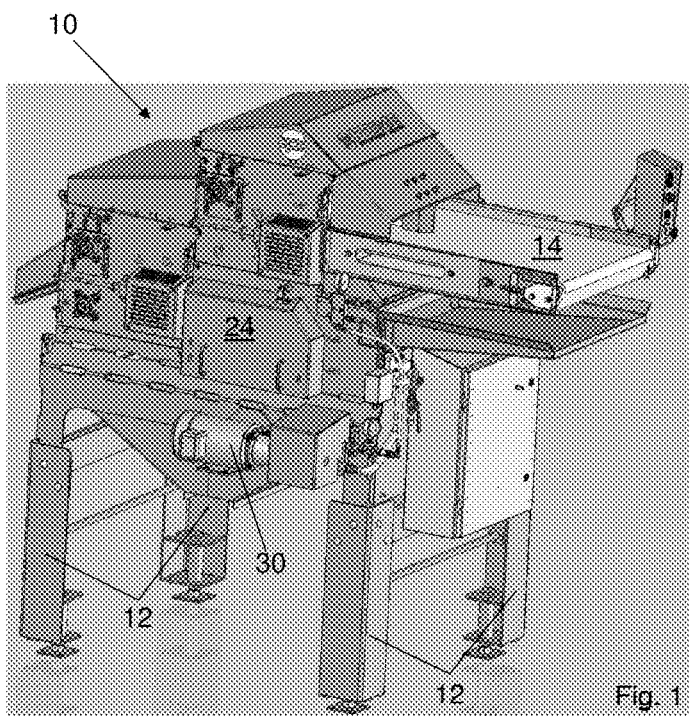
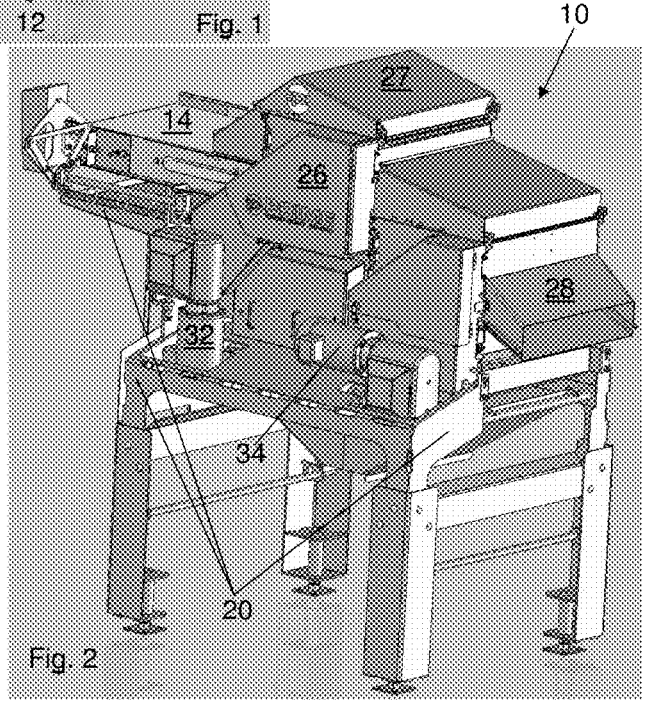

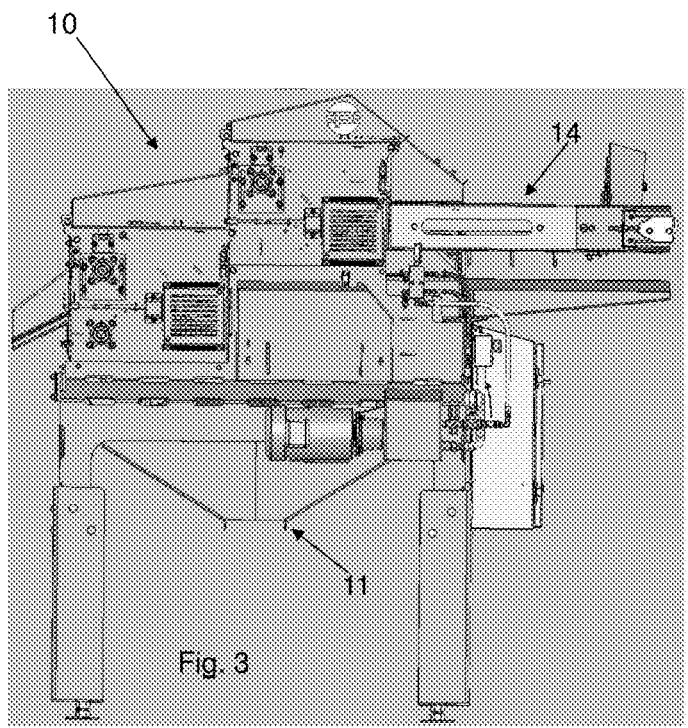
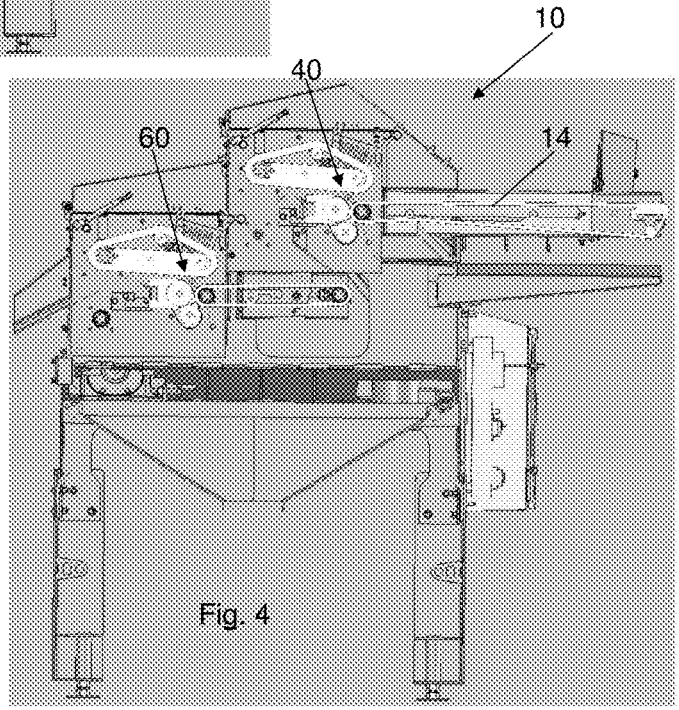

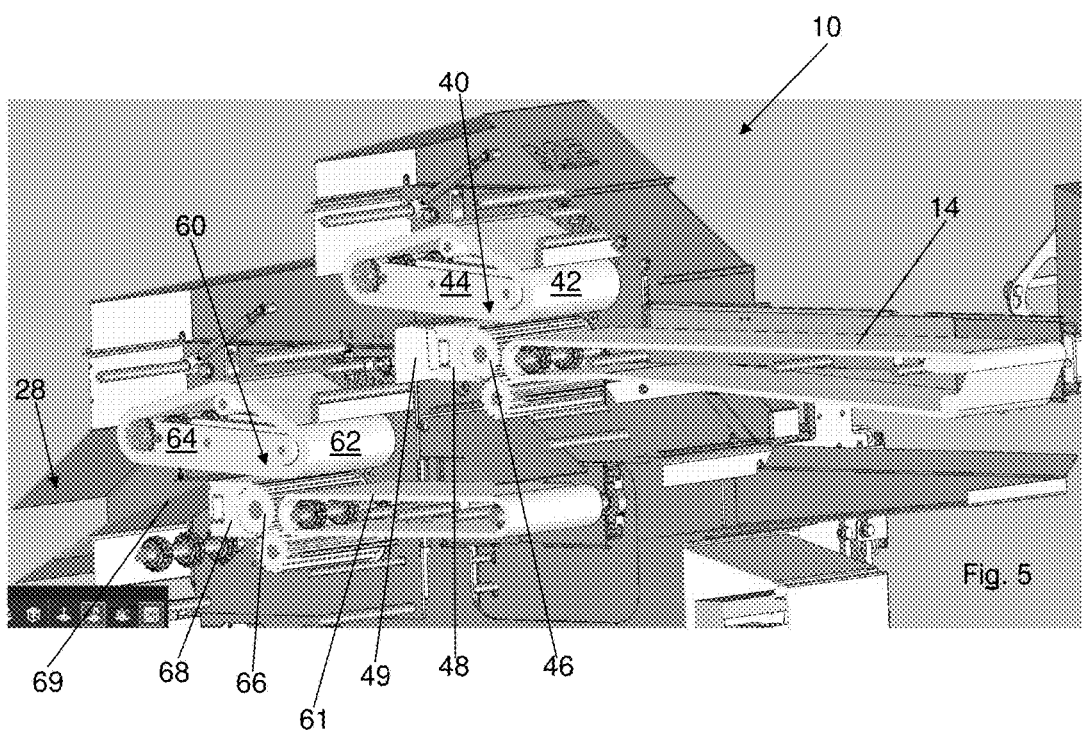

MULTIPLE-LEVEL SKINNING APPARATUS

CROSS-REFERENCES TO RELATED APPLICATIONS (Not Applicable)

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

This invention relates broadly to the field of food processing machines, and more specifically to a poultry, or other animal meat, skinning machine that removes skin and other non-muscular tissue from opposing sides of cuts of meat, such as a poultry thigh.

Over the last several decades, there has been an increase in demand for poultry products. Many new product forms have arisen wherein the outer skin is removed from the underling muscle portion before the product is prepared or processed further. Historically, skinning of a poultry product was carried out manually in the food industry at significant labor cost, high potential for injury, and at a certain level of inconsistency of performance attendant to any manual chore of this type.

It is known in the art that there is a need for efficient and safe machines to process meats generally, and poultry in particular. U.S. Pat. Nos. 6,264,542; 6,699,116; and 8,187,060, all to Gasbarro and all of which are herein incorporated in this application by reference, were substantial advances in the technology relating to the skinning of poultry. These patents disclose machines that avoid the danger to humans of hand-skinning, and provide continuous, consistent results. Although these patents teach machines with many advantages, further refinement of the conventional technology is desired. Therefore, there is a need for an improved poultry skinning machine, particularly one that reliably removes skin from both sides of the poultry piece without requiring humans to manipulate the poultry piece.

BRIEF SUMMARY OF THE INVENTION

An apparatus is described herein that ensures much greater consistency in skinning of meat cuts, and poultry cuts in particular. The apparatus permits the processer to place cut portions in one end of a single machine and thoroughly skinned portions are produced and conveyed out at the opposite end of the machine. These advantages arise due to the placement of skinning stations adjacent one another at different vertical positions on the same apparatus. The relative vertical positions allow the first skinning station to remove skin from one side of the cut portion, and then the cut portion is allowed to fall freely a short distance to a second skinning station, or at least a conveyor that transports the cut portion to the second skinning station.

The relative vertical positions are strategically chosen so that after being conveyed out of the first skinning station, the cut portion is permitted to fall the short distance to the conveyor that transports the cut portion to the second skinning station. If the vertical distance the cut portion falls is sufficiently tall, then the cut portion may rotate about one-half rotation in the drop. Under such circumstances, the second skinning station, which is preferably very similar to the first skinning station, may remove skin from the opposite side of the cut portion. By mounting both skinning stations to a frame of a single apparatus, the vertical positions are maintained.

Therefore, the apparatus ensures that opposing major surfaces of the cut portion is skinned. The first major surface is skinned in the first skinning station, and the second major surface is skinned in the second skinning station after rotating one-half rotation during the fall from the first skinning station to the conveyor that leads to the second skinning station. Such a rotation during the fall eliminates the need to have humans monitor and manually flip any cut portions that require an opposing side to be skinned.

BRIEF DESCRIPTION OF THE SEVERAL VIEWS OF THE DRAWINGS

FIG. 1 is a view in perspective illustrating a machine embodying the present invention.

FIG. 2 is a view in perspective illustrating the machine of FIG. 1.

FIG. 3 is a side view illustrating the machine of FIG. 1.

FIG. 4 is a side view in perspective illustrating the machine of FIG. 1.

FIG. 5 is a section view in perspective illustrating the machine of FIG. 1.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

The apparatus 10 is shown in FIGS. 1-5 having a frame 20 which forms a solid and rigid structure, and to which all other components of the apparatus 10 attach. Unless otherwise stated, the frame and all other components of the apparatus 10 are preferably steel, stainless steel, or similarly strong materials that may be used in a food production environment. Preferably four legs 12 rest upon the floor or other surface upon which the apparatus 10 rests, and may be height adjustable using conventional means.

An infeed conveyor 14 is preferably mounted at one longitudinal end of the apparatus 10, and receives food pieces, which may be poultry pieces, such as thighs, thigh/leg combinations and breasts, that are desirably conveyed into the apparatus 10 for skin removal. The infeed conveyor 14 receives pieces from another conveyor, a person who places pieces onto the conveyor, or any other source of such pieces. The conveyor 14 may be driven by any prime mover, such as an electric, pneumatic or any other rotary motor. Three electric rotary motors 30, 32, 34 are shown in FIGS. 1 and 2, but any equivalent prime mover may be substituted for any or all of the motors 30-34. The motors 30-34 are drivingly linked to the conveyor 14 and all other driven components of the apparatus 10, and are mounted to the frame 20. The motors 30-34 are also connected to a source of power or other movement, including without limitation electrical power and/or compressed gas. The conveyor 14 may be a flexible, continuous belt that extends around mechanisms that permit the belt to move rapidly, preferably in one direction, and thereby convey anything resting upon the upper span of the belt. Alternatively, other devices for conveying items could be substituted for the flexible belt and related mechanisms.

The apparatus 10 includes side walls 24 and 26 and, optionally, a top wall 27. The walls 24, 26 and 27 are mounted to the frame 20 in any conventional manner well-known to those of ordinary skill in the art, including without limitation screws, rivets, hinges, and weldments. The bottom of the frame 20 is open to communicate with a chute 11 for receiving the skin portion removed from the poultry product sections as described in more detail below, and directing such skin portions to a collection area, such as a bin (not shown) disposed beneath the apparatus 10. A rear discharge opening in the frame 20 includes a ramp-like structure that directs the skinned poultry product to a separate collection area relative to the removed skin portions via a chute 28. The separate collection area for the skinned product may be a conventional bin or another conveyor, not shown, as determined by the choice of the user of the apparatus 10.

The frame 20 includes a frontal opening between the walls 24 and 26 which forms a product feed inlet, through which the infeed conveyor 14 extends. The infeed conveyor 14 may be a conventional endless belt conveyor that is employed to load product and carry it along a path to a first skinning station, indicated generally at 40 in FIGS. 4 and 5. As noted above, other forms of conveying the product at the feed inlet may be employed to deliver the product to the skinning station 40 without departing from the present invention.

The first skinning station 40 is substantially similar to the skinning station described in U.S. Pat. No. 6,264,542, which is incorporated above by reference. As described in detail in this incorporated patent, the first skinning station 40 includes an endless chain belt 42 mounted on a chain support block 44 which in turn is mounted to the adjacent frame 20 wall in a vertically movable relationship. This allows a space defined between the lower run of chain belt 42 and a gripper 46 and pinch block 48 arrangement to automatically adjust to and receive a selected range of different sizes of poultry pieces to be skinned, and yet maintain a substantially constant downward force on the poultry piece during the skin removal operation. The endless belt chain 42 functions to transport the piece of poultry product entering the first skinning station 40 on the infeed conveyor 14 over the gripper 46 to the pinch block 48. The gripper 46 is rotatably mounted to the frame 20 and is driven by a conventional motor, such as one of the motors 30-34, to rotate in a counterclockwise direction (in the view of FIG. 4), which causes the upper portion to move along the path in the same direction as the bottom span of the chain belt 42, as seen in FIG. 5 (with the bottom span of the chain belt 42 moving to the left in the orientation of FIG. 5). The gripper 46 aids in moving the poultry product further along the path it is conveyed along by the infeed conveyor 14, and functions in cooperation with the pinch block 48 to engage and pull the outer skin off the product as described in detail in the incorporated patent.

The gripper 46 has a plurality of longitudinal "fins" or "teeth" evenly spaced around its circumference. The number of fins, which may be 20, 24 or 30, determine how aggressive the gripper 46 is with regard to the removal of skin, fat and other soft tissue. A more aggressive gripper removes more soft tissue, and a less aggressive gripper removes less soft tissue. Furthermore, a more aggressive gripper has a greater likelihood of removing some muscle, which is ordinarily undesirable. A larger number of fins in a given circumference results in a less aggressive gripper, and a smaller number of fins results in a more aggressive gripper. In the present invention, the number of fins is contemplated to be between 20 and 30 for the gripper 46. However, this depends on the type of food product being processed, and whether the user prefers to leave some fat in exchange for being surer that muscle is less likely to be removed unintentionally.

A conventional series of sprockets and a drive chain are drivingly linked to the chain belt 42, the gripper 46 and the pinch block 48, to thereby drive the rotating parts of the apparatus 10 when connected to one of the drive motors 30-34. As described in detail in the incorporated patents, the support block 44 is supported between the side walls 24 and 26 by the drive shaft and is pivotably mounted thereto such that the forward end of the support block 44 is free to pivot in a generally vertical direction about a horizontal axis. A stop, which may be in the form of a bolt or pin, is mounted on the inner side of each of side walls 24 and 26 above the rearward end portion of the support block 44 to function as a limit to the extent of downward pivoting of the forward end of the support block 44, and defines a selected gap or space between the chain belt 42 and the gripper 46 when no product is disposed between them. If desired, a similar stop may be employed which would engage the forward end of the support block 44 to limit the degree of upward pivoting of the forward end.

Once the poultry product has passed over the pinch block 48 and has been skinned on at least the downwardly-facing side, the chain belt 42 transports the product through the remainder of the first skinning station 40, which may include passing over a member 49 that may be a plate that extends a few inches past the pinch block 48. Once the product has passed over the member 49, it falls downwardly onto an awaiting second conveyor 61, which conveys the food product toward the second skinning station 60. The vertical gap between the top of the member 49 upon which the poultry product rests and the top of the conveyor 61 is between about six and eighteen inches, and is more preferably between about nine and fourteen inches, and is most preferably about nine inches. The vertical gap determines the drop distance of the piece of poultry product, and the drop distance is important because it is sufficient to permit the poultry product to turn about one-half rotation (about 190 degrees) during the freefall. Thus, a thigh that has first and second opposing sides with the second side facing up when it passes through the first skinning station 40 will rotate during the fall to have the first side facing up when it rests upon the conveyor 61. This means that the thigh will have one major surface facing downwardly when it passes through the first skinning station 40, and a second, substantially opposite major surface facing downwardly when the thigh is on the second conveyor 61, and thus when the thigh passes through the second skinning station. The vertical gap's distance may be varied from that preferred for many reasons, including the size of the poultry product, the presence of other structures that may deflect the product during the fall, and other parameters. Applicant has found a vertical gap distance of about nine inches to work well for chicken and turkey thighs.

During operation of the first skinning station 40, therefore, a piece of poultry product enters the feed inlet and is carried over the gripper 46. Product that is larger than the defined gap causes the forward end of support block 44 to move upward about the pivot point of the driving shaft and carry with it the forward end of the chain belt 42, which is operatively mounted thereon. The relative vertical movement between at least the forward portion of the chain belt 42 aligned with the gripper 46 permits a range of different sizes of poultry product to pass through the skinning station 40 with a controlled range of downward pressure or force being applied to the piece of poultry for a given size range of the product. This downward pressure assists the gripper 46 and pinch block 48 in removing most or all of the skin on the downwardly-facing major surface of the piece of poultry.

Once the poultry product's downwardly-facing first side has been skinned, the product passes over the member 49 and falls downwardly to the awaiting conveyor 61. During the fall, the poultry piece turns approximately one-half of a rotation and lands with the second side facing downwardly on the conveyor 61. The conveyor 61, which preferably operates continuously with the rest of the second skinning station 60, transports the product with its second side facing downwardly toward the second skinning station 60.

The second skinning station 60 may be substantially similar to the first skinning station 40. The second skinning station 60 includes an endless chain belt 62 mounted on a chain support block 64 which in turn is mounted to the adjacent frame 20 wall in a vertically movable relationship. This allows a space defined between the lower span of the chain belt 62 and a gripper 66 and pinch block 68 arrangement to automatically adjust to, and receive, a selected range of different sizes of poultry sections to be skinned, and yet maintain a substantially constant downward force on the poultry piece during the skin removal operation. The endless belt chain 62 functions to transport the piece of poultry product entering the first skinning station 60 on the second conveyor 61 over the gripper 66 to the pinch block 68. The gripper 66 is rotatably mounted to the frame 20 and is driven by a conventional motor, such as one of the motors 30-34, to rotate in the counterclockwise direction so that its top moves in the same direction as the bottom span of the chain belt 62 (with the bottom span of the chain belt 62 moving to the left in the orientation of FIG. 5). The gripper 66 aids in moving the poultry product further along the path it is conveyed by the second conveyor 61, and functions in cooperation with the pinch block 68 to engage and pull the outer skin off the poultry product.

A conventional series of sprockets and a drive chain are drivingly linked to the chain belt 62, the gripper 66 and the pinch block 68, to thereby drive the rotating parts of the second skinning station 60. The support block 64 is supported between the side walls 24 and 26 by the drive shaft and is pivotably mounted thereto such that the forward end of the support block 64 is free to pivot in a generally vertical direction about a horizontal axis. A stop, which may be in the form of a bolt or pin, is mounted on the inner side of each of side walls 24 and 26 above the rearward end portion of the support block 64 to function as a limit to the extent of downward pivoting of the forward end of the support block 64, and defines a selected gap or space between the chain belt 62 and the gripper 66 when no product is disposed between them. If desired, a similar stop may be employed which would engage the forward end of the support block 64 to limit the degree of upward pivoting of the forward end.

During operation, a piece of poultry product entering the second skinning station 60 is carried over the gripper 66. Product that is larger than the defined gap causes the forward end of support block 64 to move upward about the pivot point of the driving shaft and carry with it the forward end of the chain belt 62, which is operatively mounted thereon as described herein. The relative vertical movement between at least the forward portion of the chain belt 62 aligned with the gripper 66 permits a range of different sizes of poultry product to pass through the second skinning station 60 with a controlled range of downward force being applied to the piece of poultry for a given size range of the product.

Once the poultry product has been transported by the chain belt 62 past the gripper 66 and pinch block 68, it may be transported over an inclined member 69 that forms the lower surface of the chute 28. The poultry product has been skinned on both opposing major sides once it has passed the second skinning station 60 and is transported down the inclined member 69 and out of the apparatus 10, preferably to another conveyor, a container or any other receptacle (not shown).

It is understood that the chain belts 42 and/or 62 may be a plurality of laterally spaced, conventional endless conveyor chains provided with raised points to engage a piece of poultry entering the feed inlet and progressively carrying it past the gripper 46, the gripper 66 and then out through the discharge opening of the chute 28. Such a chain belt may be comprised of conventional stainless steel chain or other suitable materials, such as DELRIN® brand acetal homopolymer resins, which are appropriate for food handling operations.

It is also understood that the preferred embodiment of the present invention shown in FIGS. 1-5 may be modified substantially and still remain within the spirit of the invention. For example, the person of ordinary skill will understand that if larger or smaller food product pieces are used, then the dimensions described above may be modified. Furthermore, even with the same size food product pieces, the dimensions described above may be modified to suit the manufacturing facility or for any other reason. Still further, it is contemplated to have additional skinning stations beyond the second skinning station, with or without similar drop distances to effect rotation to further ensure that both major surfaces of the food product piece are skinned.

It is contemplated to have a different number of fins on the grippers 46 and 66. Thus, the gripper 46 may be aggressive with a smaller number of fins, such as 20, and the gripper 66 may be less aggressive with a larger number of fins, such as 30. Such an arrangement permits the less aggressive gripper 66 to remove any remaining skin, fat or other loose soft tissue with less risk of removing muscle than with the gripper 46 that is more aggressive.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for removing skin from a food product having opposing first and second sides, the apparatus comprising:
   (a) a food product inlet that receives the food product and transports the food product along a first path;
   (b) a first skinning station disposed in the first path and configured to remove skin from the first side of the food product;
   (c) a second skinning station configured to remove skin from the second side of the food product;
   (d) a conveyor disposed at a vertically lower position than the first skinning station, the conveyor configured to transport the food product only toward the second skinning station; and
   (e) a vertical gap between the first skinning station and the conveyor, the vertical gap being sufficient to cause the food product to complete about one-half of a rotation after freely falling from the first skinning station and before landing on the conveyor.

2. The apparatus in accordance with claim 1, wherein the vertical gap is about nine inches.

3. The apparatus in accordance with claim 1, wherein the first and second skinning stations, the conveyor and the food product inlet are mounted to a frame of a single apparatus.

4. An apparatus for removing skin from a poultry product having opposing first and second sides, the apparatus comprising:
   (a) a food product inlet with a first conveyor that receives the poultry product and transports the poultry product along a first path;
   (b) a first skinning station disposed in the first path, the first skinning station including a rotatably-mounted gripper and a pinch block in close-clearance configuration for removing skin from the first side of the poultry product that faces a substantially downward direction;
   (c) a second skinning station including a rotatably-mounted gripper and a pinch block in close-clearance configuration for removing skin from the second side of the poultry product that faces a substantially downward direction;
   (d) a second conveyor disposed at a vertically lower position than the first skinning station, the second conveyor configured to transport the poultry product only toward the second skinning station; and
   (e) a vertical gap between the first skinning station and the second conveyor, the vertical gap being sufficient to cause the poultry product to complete about one-half of a rotation after freely falling from the first skinning station and before landing on the second conveyor.

5. The apparatus in accordance with claim 4, wherein the vertical gap is about nine inches.

6. The apparatus in accordance with claim 4, wherein the first and second skinning stations and the first and second conveyors are mounted to a frame of a single apparatus.

7. A method for removing skin from a poultry product having a first side and an opposite, second side, the method comprising:
   (a) transporting the poultry product, with the first side of the poultry product facing a substantially downward direction, on a first conveyor toward a first skinning station that includes a rotatably-mounted gripper and a pinch block in close-clearance configuration;
   (b) removing skin from the first side of the poultry product at the first skinning station;
   (c) dropping the poultry product through a freefall onto a second conveyor that is disposed at a vertically lower position than the first skinning station, thereby rotating the poultry product about one-half of a rotation until the second side of the poultry product faces a substantially downward direction;
   (d) transporting the poultry product on the second conveyor only toward a second skinning station that includes a rotatably-mounted gripper and a pinch block in close-clearance configuration; and
   (e) removing skin from the second side of the poultry product at the second skinning station.

\* \* \* \* \*